May 27, 1947.  C. E. WYRICK  2,421,174
QUICK-CHANGE CHUCK
Filed Aug. 5, 1944
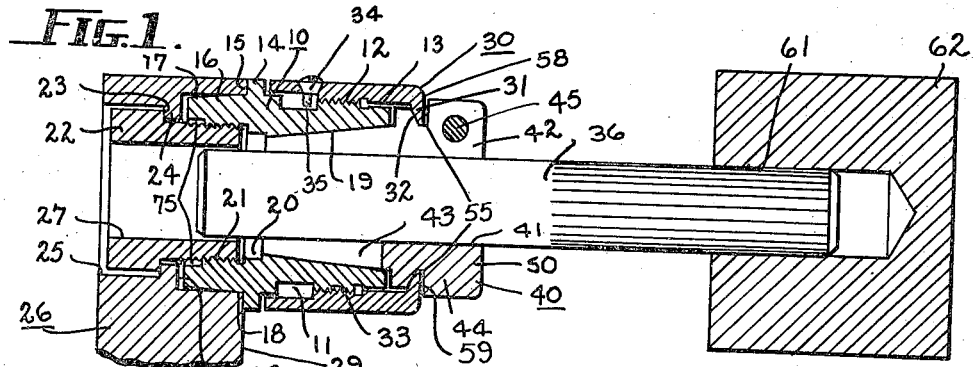
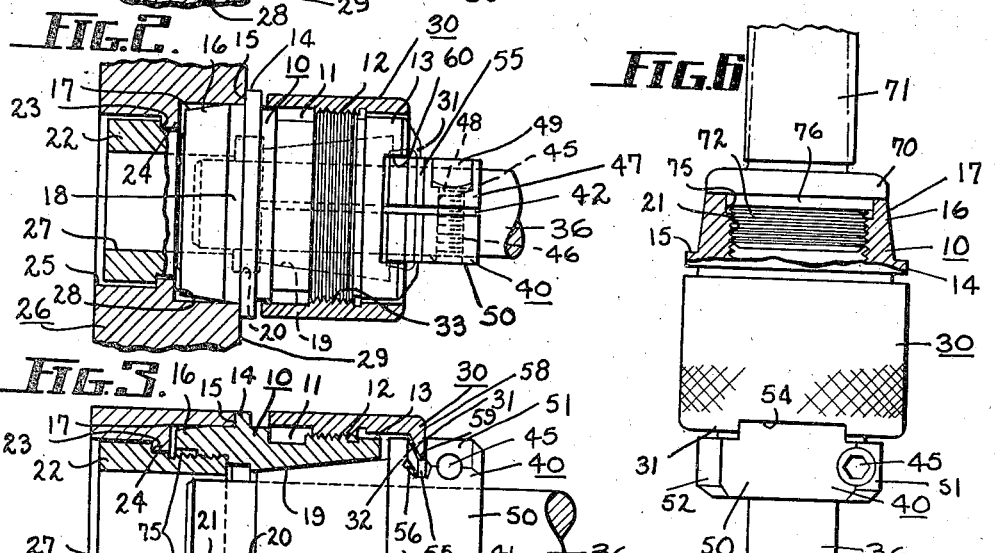
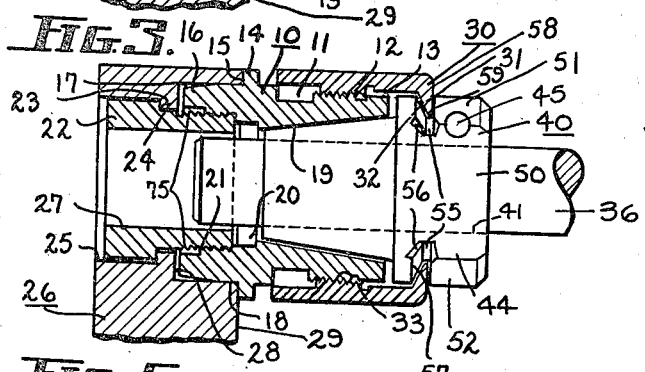
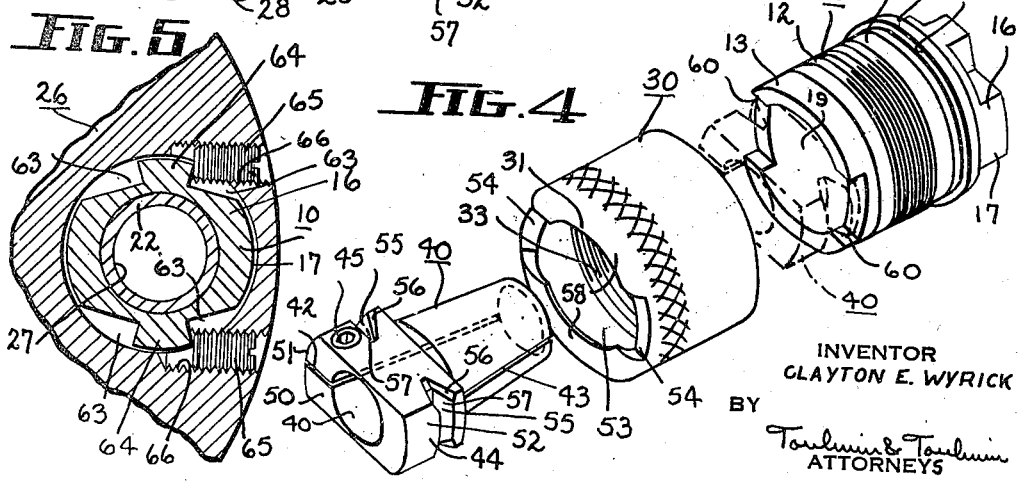
INVENTOR
CLAYTON E. WYRICK
BY
Toulmin & Toulmin
ATTORNEYS Patented May 27, 1947

2,421,174

UNITED STATES PATENT OFFICE 2,421,174

QUICK-CHANGE CHUCK

Clayton E. Wyrick, Miami, Fla.; Mary R. Wyrick, executrix of said Clayton E. Wyrick, deceased, assignor to Hopkins-Wyrick Laboratories, Inc., Miami, Fla., a corporation of Florida Application August 5, 1944, Serial No. 548,229

10 Claims. (Cl. 279—16)

This invention relates to tool chucks, and particularly to tool chucks that are adapted for a quick interchange of tools in the chuck.

An object of the invention is to provide an improved tool chuck that is constructed and arranged in a manner that a tool can be rigidly and solidly held within the chuck, or can be loosely positioned therein while being driven by the chuck so that the tool carried thereby will float during its work performing operation.

Another object of the invention is to provide a tool chuck that is constructed and arranged in a manner to permit a rapid interchange of tools in the chuck.

Still another object of the invention is to provide an improved tool chuck that is constructed in a manner to receive a tool holder that is mechanically driven by the chuck when in position therein and also frictionally engages the chuck through means of a tapered body portion having a taper thereon such as to prevent relative movement between the tool holder and the body of the chuck and to establish positive axial alignment between the tool holder and the chuck body.

Another object of the invention is to provide a tool chuck in accordance with the foregoing object wherein the tool holder is mechanically held within the chuck and mechanically driven thereby though the tool holder itself is frictionally free of the chuck so that the tool carried thereby can float during a work operation of the tool.

Another object of the invention is to provide a tool chuck constructed and arranged for a rapid interchange for tools in the chuck and that is constructed in a manner to permit accurate alignment of the chuck upon a supporting body so that the chuck will be disposed accurately co-axially with a supporting member or at right angle thereto.

Still another object of the invention is to provide an improved tool chuck that is provided with means for adjusting the radial position of the chuck within a supporting member so as to adjust the position of the tool carried thereby.

Still another object of the invention is to provide a tool chuck that is constructed and arranged in a manner that there is provided a tapered chamber therein to receive a tapered portion of the body of a tool holder, the chuck being arranged to force the tapered portion of the tool holder body into the tapered chamber of the chuck whereby to establish axial alignment therebetween and to release the tapered body of the tool holder from the chuck.

A still further object of the invention is to provide an improved quick-change chuck in accordance with the foregoing object wherein a rotating ring member provides the means for forcing the tool holder into the chuck body and for releasing the same therefrom, and wherein the ring member also provides means to release the tool holder from the chuck body but to mechanically retain the tool holder in the chuck body so that the tool carried thereby can float freely during a work operation.

Further objects and advantages will become apparent from the drawings and the following description.

In the drawings:

Figure 1 is a transverse cross sectional view of the improved quick-change chuck of this invention.

Figure 2 is a transverse cross sectional view of the chuck shown in Figure 1 but taken at right angles thereto, showing the chuck body in elevation.

Figure 3 is a transverse cross sectional view similar to Figure 1 but showing the tool holder in elevation and in released position for floating the tool while it is performing a work operation.

Figure 4 is a perspective elevational view of the elements of the quick-change chuck showing them in axial alignment and with the elements in the relative position with respect to one another that they would assume when in assembling relationship.

Figure 5 is a transverse cross sectional view showing the means for adjusting the axial position of the chuck in a supporting member.

Figure 6 is an elevational view, partially in cross section, of the quick-change chuck as applied to a spindle for insertion into a standard machine tool, such as a drill press.

In this invention the quick-change chuck consists of a chuck body 10 that has an annular recess or groove 11 extending around the middle portion of the body. The body 10 has an enlarged portion on one side of the annular recess 11 that receives the threads 12, the nose portion 13 of the chuck body 10 having a smooth annular surface.

On the opposite side of the annular recess 11 there is provided an annular flange 14 that has a surface 15 that is disposed accurately normal to the axis of the body 10. A protruding portion 16 of the body 10 extends beyond the annular flange 14 and has a tapered surface 17 thereon that tapers from the flange 14, with the exception of a small annular surface 18 that is disposed accurately normal to the surface 15.

An inwardly tapered bore 19 is provided in the body 10 to receive the tapered body portion of a tool holder to be hereinafter described. The tapered bore 19 terminates in an annular recess 20 that receives the threads 21. The threads 21 in the body 10 are engaged by a shell draw bolt 22 that has the one end threaded for this purpose. The bolt 22 is provided with an annular flange portion 23 that engages an inwardly projecting flange 24 provided in a recess 25 of a support member 26. The bolt 22 is hollow and has an internal bore 27 through which a tool can extend in a manner hereinafter described.

The support member 26 has a second annular recess 28 that is of a diameter equal to the diameter of the annular surface 18 on the chuck body 10, the side wall surface of the recess 28 being accurately normal to the face 29 of the support member 26.

It may thus be seen, in reference to Figure 1, that when the annular surface 15 is disposed against the face 29 of the support member 26 that the chuck body 10 will be positioned accurately normal to the surface 29 of the support member. Also, the narrow annular surface ring portion 18 of the chuck body 10 will accurately locate the chuck body 10 coaxially with the recess 28 in the support member 26 whereby to locate the chuck body 10 accurately coaxial with respect to the axis of the recess 28.

If the support member 26 should be a turret member whereby the work tools carried by the chuck body 10 are brought into working relationship with a piece to be operated upon, it will be appreciated that this accurate alignment of the chuck body 10 will maintain the tools carried thereby in a predetermined relationship with respect to work that is to be operated upon.

A hollow ring member 30 is provided with a depending nose portion 31 that has an angularly disposed inner surface 32 that engages a tool holder hereinafter described. The inner surface of the hollow ring member receives the threads 33 that engage the threads 12 on the exterior of the chuck body 10 whereby rotation of the ring member 30 upon the chuck body 10 will cause axial movement of the ring thereon. A stop pin 34 extends through the ring member 30 and has the inner end 35 thereof disposed within the annular recess 11 to limit the forward or rightward movement of the ring 30, as viewed in Figure 1.

A tool holder 40 is provided with an axial bore 41 adapted to receive a work tool 36 such as the reamer as illustrated in the drawing in Figure 1. The shank of the work tool 36 may extend through the bore 41 in the tool holder 40, and may thus extend through the internal bore 27 in the bolt 22, should the tool be of such length. The tool holder 40 has a longitudinal slot 42 on one side thereof that extends completely through the body to the bore 41. The opposite side of the body 40, 180° from the slot 42 is provided with a slot 43 that extends through the body 40 to the bore 41 therein and midway between the front and rear ends of the tool holder body 40, whereby the halves of the tool holder body 40 are joined by the solid connecting body portion 44. A cap screw 45 engages the threaded hole 46 provided in one-half of the tool holder body member 44, the opposite half portion 47 having a smooth sided hole 48 therein to permit rotation of the cap screw therein, the head 49 of the cap screw being countersunk in the half portion 47 of the tool holder body 40.

It may thus be seen that since the tool holder body 40 is provided with a slot through the major portion thereof that threading of the cap screw into the hole 46 will clamp a work tool 36 within the tool holder body 40.

The tool holder body or tool adapter 40 has the front portion 50 thereof substantially in the shape of a rectangle, the ends 51 and 52, however, being arcuately shaped to fit within the internal bore 53 of the ring 30 in close proximity of the wall. The ring member 30 has the lip or nose portion 31 cut away to provide recesses 54 in this lip portion as indicated in Figure 4. With the lip portion cut away in this manner the tool holder body 40, or tool adapter, can be inserted into the ring portion 30 when the flat sides of the head portion 50 of the tool holder 40 align with the recesses 54 of the ring portion 30. This head portion 50 of the tool adapter 40 is provided with arcuate recesses 55 in both ends 51 and 52 of the head portion 50. These arcuate recess portions 55 are arcs of a common circle struck from the axis of the body 40 and are adapted to receive the lip or nose portions 31 of the ring 30, as illustrated in Figure 1, when the tool adapter 40 is positioned therein. The corners of the arcuate recesses 55 are broken, as indicated by the portions 56, at a slight angle to permit freedom of entry of the lip portion 31 into the arcuate recesses 55.

These recesses 55 have a rearward face 57 that is disposed upon the same angle as the angular face 32 of the lip portion 31 that engages the same when forcing the tool holder 40 into the chuck body 10. The front face 58 of the ring 30 engages the front face 59 of the recesses 55 to force the tool holder body 40 outwardly from the chuck body 10 to release the same therefrom.

When the tool adapter 40 is in position in the chuck body 10 the head portion 50 thereof rests within the recess portions 60 provided in the front edge of the chuck body 10, as illustrated in Figure 4. Therefore, the chuck body 10 is mechanically connected to the tool adapter 40 for rotating the same. The tapered portion 40a of the tool adapter 40, when in engagement with the wall of the tapered bore 19, aligns the tool adapter in the body 10 coaxial therewith.

In addition, the recesses 60 provided in the chuck body 10 will drive the tool holder 40 when the ring 30 has been rotated just sufficiently to break the frictional engagement between the tapered surface 19 in the chuck body 10 and the tapered portion of the tool holder or adapter 40. This position is illustrated in Figure 3, wherein there is shown a clearance between the tapered surface 19 of the chuck body 10 and the tapered portion of the tool adapter 40, as well as a clearance between the lip 31 and the walls of the recesses 55, thereby indicating that the tool adapter 40 is resting loosely within the chuck body but retained therein by means of the lip portion 31 and with driving connection between the chuck body 10 and the tool adapter 40 being maintained by means of the recesses 60. In this position of operation, the rotation of the chuck may drive the reamer 36 to ream out a hole 61 previously drilled in a work piece 62, the reamer 36 floating itself to follow the course of the hole 61 that has previously been drilled. This is what is known as the floating operation of the tool holder or adapter, and may be performed with any tool desired, the reamer in this case merely being one example of the use of the quick-change chuck in this manner.

When the quick-change chuck is to carry a tool that requires a particular location of the cutting edge of the tool with respect to the work, such as a boring tool, it is desirable that the chuck be adjustably positioned within the support member for the same in order to position the cutting edge of the tool either at or below center of the work being operated upon. To provide such adjustment the protruding portion 16 of the chuck body 10 is provided with a plurality of recesses 63 that provide tongues 64 therebetween. These tongues 64 are engaged by set screws 65 threaded in tapped holes 66 provided in the support member 26 by advancing one of the set screws into its threaded hole and backing the other out of its threaded hole and vice versa. Axial rotation of the chuck body 10 will be produced to rotate the tool holder 40 and thus position the work tool carried thereby relative to the center of the work that is to be performed by a tool such as a boring tool.

In Figures 1 to 3 the quick-change chuck has been illustrated as being carried upon a support member 26 that is a turret member adapted to rotate upon an axis parallel with the axis of the work tools 36. However, it is to be understood that the quick-change chuck can be used in connection with any turret or other machine tool, and in Figure 6 there is illustrated the use of the quick-change chuck upon a spindle that is adapted to be received by a machine tool such as a drill press.

In this illustration the chuck body 10, the ring 30 and the tool holder 40 are all constructed in the same manner as heretofore described so that the same reference numerals will be used. The adapter 70 by which the quick-change chuck is connected to a machine tool, such as a drill press, consists of a shank 71 that may be either straight or provided with a taper in conventional manner. The shank 71 has a threaded portion 72 that is threaded into the threads 21 of the body 10 of the quick-change chuck. The body 10 of the quick-change chuck has a recess 75 that receives a shouldered portion 76 that aligns the axis of the adapter 70 with the axis of the chuck body 10 in the same manner as heretofore described with regard to the surface 18 on the body 10. It will thus be seen that this arrangement provides an adapter that may receive the same chuck body 10 as heretofore described without any alteration whatever so that the quick-change chuck body can readily and easily be adapted for use on a drill press. Of course, by merely changing the shape of the shank 71 the adapter 70 can be used in many places to adapt the use of a standard quick-change chuck to a particular machine and the alignment of the chuck with the axis of the adapter will be the same as heretofore described with regard to the device disclosed in Figure 1.

While the device disclosed and described herein constitutes a preferred form of the invention, yet it will be understood that the device is capable of structural alteration without departing from the spirit of the invention, and that all such modifications as fall within the scope of the appended claims are intended to be included herein.

Having thus fully described my invention, what I claim as new and desire to secure by Letters Patent is:

1. A tool chuck including in the combination a chuck body having an axial bore therein to receive a tool holder, transverse recess means in the forward end of said body adjacent said bore, a tool holder for positioning in said bore in said body and having means thereon to engage said recess means whereby to be driven thereby, means entirely on said tool holder to clamp a tool therein, and retaining means engaging said tool holder and threadedly received on said body for removably securing said tool holder within said body and having two selective positions one of which rigidly secures said tool holder to said body for rigid driving connection from said body to a tool in said tool holder through said tool holder and the other retains said tool holder loosely in said body but with the said means on the tool holder in engagement with said recess means for a floating drive of a tool in said tool holder.

2. A tool chuck including in the combination a chuck body having a tapered axial bore therein to receive a tool holder, transverse recess means in said body adjacent said bore, a tool holder, means on said tool holder to clamp a tool therein, said tool holder having a tapered portion for positioning in said bore and having a radially elongated collar to engage said recess means whereby to drive said tool holder from said body, and retaining means on said body removably securing said tool holder therein and having two selective positions one of which rigidly secures said tool holder to said body with said tapered parts in intimate engagement for positive axial alignment thereof and the other retains said tool holder loosely in said body but with said collar in driving engagement with said recess means, whereby the tool carried by said tool holder can float in axial alignment of said body during the work operation.

3. A tool chuck including a chuck body having an axial tapered bore therein, a transverse recess in one edge of said body adjacent said bore, a tool holder including means for clamping a tool therein and having a tapered portion thereon for positioning in the tapered bore in said body and having a radially elongated head portion for positioning in said recess, retaining means rotatably disposed upon said body for axial movement thereon and engaging said head of said tool holder to hold the same upon said body, said retaining means having one selective position with respect to said body to rigidly hold said tool holder in said chuck body and a second selective position which releases said tool holder from rigid engagement with said chuck body but retains said head of said tool holder in engagement with said recess in said chuck body whereby said chuck drives said tool holder and the tool therein when said holder is in loose position in said body.

4. A tool chuck including a chuck body having an axial tapered bore therein, a recess in the forward edge of said body adjacent said bore, a tool holder having a tapered portion thereon adapted to be positioned within the tapered bore in said body and having a radially elongated head portion for engagement with said recess, means entirely on said tool holder to clamp a tool therein, recess means in said head, and a retaining member rotatably disposed upon said chuck body and having means extending therefrom into said recess means in said head of said tool holder to retain the same in position rigidly in said chuck body upon axial movement thereof in one direction and to release said tool holder from the chuck body upon rotation in the opposite direction, but with said head portion in engagement with said first-mentioned recess for a floating drive of a tool positioned in said tool holder, and a radially elongated recess in said retaining member to freely receive said head for passage therethrough upon insertion or removal of said holder in said body.

5. A tool chuck including a chuck body having a tapered bore axially therein, a recess in one edge of said body transverse thereof through said bore, a tool holder having a conical body portion for positioning in said tapered bore and a substantially rectangular head portion for positioning in said recess, an internal bore in said tool holder for receiving a tool, means on said tool holder for fixedly securing a tool in said last mentioned bore, recess means in said head of said tool holder, retaining member rotatably positioned upon said chuck body axially movable thereon and having means projecting therefrom engaging said recess means in said head of said tool holder whereby said conical body portion of said tool holder will be forced into engagement with said tapered internal bore in said chuck body upon rotation of said retaining means in one direction and will be released therefrom upon rotation of said retaining means in the opposite direction, and a radially elongated recess in said retaining member to freely receive said head for passage therethrough upon insertion or removal of said holder in said body.

6. A tool chuck including in the combination a chuck body having a tapered bore axially therein, a recess in one edge of said body extending transversely of said bore, a tool holder having a conical body portion for positioning in said tapered bore in said body and a substantially rectangular head portion to engage said recess, an axial bore in said tool holder for receiving a tool, means in said head portion for fixedly securing a tool in said last mentioned bore, radial recess means in said head of said tool holder, and retaining means rotatably positioned upon said body axially movable thereon and having means projecting radially therefrom engaging said recess means in said head whereby rotation of said retaining means in one direction will rigidly hold said holder in said body and rotation of said retaining means in the opposite direction will release said holder from said body, said retaining means having further a selective position wherein to release said conical body portion from the tapered bore in said chuck body while mechanically retaining said head in engagement with said recess means in said body whereby said tool holder is loosely positioned in said body and driven thereby through said recess means therein.

7. A tool chuck including in the combination a chuck body having a tapered bore axially therein, a recess in one edge of said body extending transversely of said bore, a tool holder having a conical body portion for positioning in said tapered bore in said body and a substantially rectangular head portion to engage said recess, an axial bore in said tool holder for receiving a tool, means in said head portion for fixedly securing a tool in said last mentioned bore, radial recess means in said head of said tool holder, retaining means rotatably positioned upon said body axially movable thereon and having means projecting radially therefrom engaging said recess means in said head whereby rotation of said retaining means in one direction will rigidly hold said holder in said body and rotation of said retaining means in the opposite direction will release said holder from said body, said retaining means having further a selective position wherein to release said conical body portion from the tapered bore in said body while mechanically retaining said head in engagement with said recess means in said body whereby said tool holder is loosely positioned in said body and driven thereby through said recess means therein, and a flange face means normal to the axis of said body cooperating with a narrow annular ring surface means parallel and coaxial with the axis of said body for aligning said body in a support member.

8. A tool chuck including in the combination a chuck body having a tapered bore axially therein, a recess in one edge of said body extending transversely of said bore, a tool holder having a conical body portion for positioning in said tapered bore in said body and a substantially rectangular head portion to engage said recess, an axial bore in said tool holder for receiving a tool, means in said head portion for fixedly securing a tool in said last mentioned bore, radial recess means in said head of said tool holder, retaining means rotatably positioned upon said body axially movable thereon and having means projecting radially therefrom engaging said recess means in said head whereby rotation of said retaining means in one direction will rigidly hold said holder in said body and rotation of said retaining means in the opposite direction will release said holder from said body, said retaining means having further a selective position wherein to release said conical body portion from the tapered bore in said body while mechanically retaining said head in engagement with said recess means in said body whereby said tool holder is loosely positioned in said body and driven thereby through said recess means therein, a flange face means normal to the axis of said body co-operating with a narrow annular ring surface means parallel and coaxial with the axis of said body for aligning said body in a support member, a support member in co-operative association with said body having faces therein to receive said flange face and ring on said body and an axial bore, and a drawbolt extending through said axial bore into threaded engagement with said body for securing the same upon said support.

9. A tool chuck including in the combination a chuck body having a tapered bore axially therein, a recess in one edge of said body extending transversely of said bore, a tool holder having a conical body portion for positioning in said tapered bore in said body and a substantially rectangular head portion to engage said recess, an axial bore in said tool holder for receiving a tool, means in said head portion for fixedly securing a tool in said last mentioned bore, radial recess means in said head of said tool holder, retaining means rotatably positioned upon said body axially movable thereon and having means projecting radially therefrom engaging said recess means in said head whereby rotation of said retaining means in one direction will rigidly hold said holder in said body and rotation of said retaining means in the opposite direction will release said holder from said body, said retaining means having further a selective position wherein to release said conical body portion from the tapered bore in said body while mechanically retaining said head in engagement with said recess means in said body whereby said tool holder is loosely positioned in said body and driven thereby through said recess means therein, a flange face means normal to the axis of said body co-operating with a narrow annular ring surface means parallel and coaxial with the axis of said body for aligning said body in a support member, a support member in co-operative association with said body having faces therein to receive said flange face and ring on said body and an axial bore, a drawbolt extending through said axial bore into threaded engagement with said body for securing the same upon said support, and a hollow bore in said drawbolt axially aligned with said bore in said tool holder whereby a tool retained therein can extend through said drawbolt.

10. A tool chuck including a chuck body having an internal bore therein to receive a tool holder, recess means in one edge of said body transverse of said bore, a tool holder having a portion thereof for positioning in said bore and having a radially elongated head thereon engaging said recess means whereby to be driven thereby, a hollow retaining means axially movable on said body and engaging said head for forcibly securing said tool holder within said body and for forcibly releasing said tool holder from said body, and a radially elongated recess in said retaining means larger than said head to allow for insertion and removal at will of said tool holder from said body.

CLAYTON E. WYRICK.

REFERENCES CITED

The following references are of record in the file of this patent:

UNITED STATES PATENTS

| Number | Name | Date |
|---|---|---|
| 283,124 | Lorenz | Aug. 14, 1883 |
| 1,782,633 | Schiltz | Nov. 25, 1930 |
| 1,973,942 | Buhr | Sept. 18, 1934 |
| 1,618,988 | Redinger | Mar. 1, 1927 |